(12) United States Patent
Filreis et al.

(10) Patent No.: US 8,533,477 B2
(45) Date of Patent: Sep. 10, 2013

(54) FACSIMILE TRANSMISSION AUTHENTICATION

(75) Inventors: James Filreis, Framingham, MA (US); Eric Burger, Amherst, NH (US)

(73) Assignee: Dialogic Corporation, Montreal (CA)

( * ) Notice: Subject to any disclaimer, the term of this patent is extended or adjusted under 35 U.S.C. 154(b) by 1271 days.

(21) Appl. No.: 11/484,066

(22) Filed: Jul. 11, 2006

(65) Prior Publication Data

US 2008/0016356 A1 Jan. 17, 2008

(51) Int. Cl.
*H04L 29/06* (2006.01)

(52) U.S. Cl.
USPC ............ 713/176; 713/168; 713/178; 713/179

(58) Field of Classification Search
USPC .................................. 713/176, 168, 178, 179
See application file for complete search history.

(56) References Cited

U.S. PATENT DOCUMENTS

| | | | |
|---|---|---|---|
| 5,530,755 A | 6/1996 | Pailles et al. | |
| 5,579,393 A | 11/1996 | Conner et al. | |
| 5,590,196 A * | 12/1996 | Moreau | 705/78 |
| 6,073,242 A * | 6/2000 | Hardy et al. | 726/1 |
| 6,111,953 A | 8/2000 | Walker et al. | |
| 6,170,744 B1 * | 1/2001 | Lee et al. | 235/380 |
| 6,188,766 B1 * | 2/2001 | Kocher | 380/246 |
| 6,430,608 B1 | 8/2002 | Shaio | |
| 6,728,880 B1 * | 4/2004 | Sites | 713/178 |
| 6,757,827 B1 | 6/2004 | Geist | |
| 6,785,405 B2 | 8/2004 | Tuttle et al. | |
| 6,938,157 B2 | 8/2005 | Kaplan | |
| 7,007,303 B2 | 2/2006 | Goldberg et al. | |
| 7,051,206 B1 | 5/2006 | Giest et al. | |
| 7,080,041 B2 | 7/2006 | Nagel | |
| 2002/0026583 A1 | 2/2002 | Harrison et al. | |
| 2005/0246541 A1 | 11/2005 | Ginter et al. | |
| 2006/0147083 A1 * | 7/2006 | Piersol et al. | 382/100 |
| 2009/0015876 A1 * | 1/2009 | Brown | 358/405 |

FOREIGN PATENT DOCUMENTS

| | | | |
|---|---|---|---|
| JP | 2005260490 A | * | 9/2005 |
| WO | WO 2005060154 A1 | * | 6/2005 |

OTHER PUBLICATIONS

JP 2005-260490 A (Takagi Tomohito) Sep. 22, 2005 (computer-generated translation into English). [online] [retrieved on Feb. 13, 2010]. Retrieved from : Patent Abstracts of Japan Database.*
Technology Solutions, Image Security, http://www.unisys.com/products/payment_systems/image_security.htm, p. 1, Unisys Corporation, Apr. 5, 2006.
Check Image Protection in the 21$^{st}$ Century, www.unisys.com, Unisys Corporation, 2004.

* cited by examiner

*Primary Examiner* — Justin T Darrow
(74) *Attorney, Agent, or Firm* — Chapin IP Law, LLC

(57) ABSTRACT

A facsimile system and method provides authentication of transmitted image information, which authentication may be in the form of a signature page. An authentication device computes authentication information at a sending device, a receiving device, both, or at a remote location during transmission. The signature page may also be transmitted with the document. The sending and receiving devices may each generate signature pages or acknowledgement of receipt in response to receiving a signature page. The authentication information may be encrypted with a public/private key pair. The authentication information may be in the form of a checksum, and may be prepared based on separate regions of the document. A previously generated signature page is compared to a newly generated signature page to verify the document content or authenticity. Document authentication signatures may include machine-readable symbols to represent the authentication information.

30 Claims, 4 Drawing Sheets

FACSIMILE TRANSMISSION AUTHENTICATION

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention relates generally to authentication of transmissions based on scanned or digitized images, and relates more particularly to authentication of facsimile transmitted information in the form of an image.

2. Description of Related Art

Authentication of transmission and electronic communications is an important issue that has been addressed in a number of ways in various applications. For example, encryption is often used in computer networks to provide an authentication technique where it is believed that only the sender and receiver are able to access the content of a given communication. The sender encrypts the communication, for example, with a key that is part of a public/private key pair, and sends the encrypted information to the receiver over a communication link. The receiver decrypts the communication using the other part of the public/private key pair, and reviews the transmitted content. Sometimes an authentication code or element is transmitted with the communication, such as a checksum or time and date stamp. The code contributes to identifying the source and assuring the receiver that the received communication is authentic and the same as that transmitted by the sender.

Security for electronic images is also an important issue that may involve authentication with regard to unauthorized copying. Typically, an electronic image is "watermarked" to provide a secure indication of information associated with the image. Such associated information can include the author, owner, time and date created, particular characteristics related to the image and so forth. The watermark is not visible as part of the image, but is in the form of an electronic signature typically embedded in the data of the file containing the image. The watermarked image is static, in that it does not reflect any information associated with a transmission process. Typically, an image watermark is used to secure intellectual property rights in the image, or provide evidentiary support for claims of authorship, ownership and the like.

Authentication may also be an issue involved in the comparison of two electronic copies of a document, for example. Typically, the electronic documents are compared on a unit-by-unit basis, such as byte by byte or word for word. This type of comparison and authentication typically assumes the two documents are in the same format and are generated by the same program or software. That is, the authentication is conducted based on direct electronic comparisons between the documents. This type of comparison or authentication is specific to a particular format of document and does not relate to image inspection or authentication. In addition, this type of document authentication does not take into account transmission of documents and their authentication over a communication link. Moreover, this type of document comparison does not operate directly on hard copy image files, such as scanned documents or images in electronic format.

SUMMARY

The present disclosure provides a system and method for authenticating document images derived from a hard copy, such as paper, or electronic documents, especially when transmitted over a communication link. A special case for which the system and method are applicable is the transmission of a document image based on a hard copy or an electronic source over a communication link in a facsimile system. The facsimile transmission system is somewhat unique in that the sender of the document retains a document original, while the recipient, who is geographically remote, receives a hard copy or electronic document that is reconstructed from the transmitted image. The disclosed system and method provide for authentication of hard copy or electronic documents for both the image sender and receiver.

According to an exemplary embodiment of the present invention, there is provided a facsimile transmission system and method for sending and receiving a facsimile with authentication based on an original hard copy document. A transmitting facsimile device generates an electronic image of the hard copy document, and a signature page that is available to the sender for authentication of the transmitted image. The transmitting device generates the signature page based in part on, for example, parameters of the facsimile data transmitted.

According to an aspect of the disclosed system and method, a receiving facsimile device generates a signature page based in part on, for example, the transmitted data received at the receiving device, so that the signature page is independent of the sending or receiving devices. The signature page generated at the receiving device authenticates the received document, especially in conjunction with a sending device generated signature page. The receiver generated signature page can provide various indicia related to the received document or information. For example, the signature page generated by the receiving device can include time and date information, identification of a sending device or entity, and other information unique to the transmission of the specific document or information.

According to another aspect, the disclosed system and method provides a signature page generated at a sending device based on transmitted information, and a signature page generated at a receiving device based on the received information. The two signature pages can be the same or different by design, and can be exchanged between the sender and the receiver. The signature pages are independent of the sending or receiving devices, in that they can be generated without being dependent upon the hardware of the sending or receiving devices, and without being dependent on interaction with each other beyond the image transmission itself. Alternatively, or additionally, the sender can send a sender generated signature page to the receiver, which is used by the receiver to generate a receiver signature page, which is then returned to the sender. The exchanged signature pages can include information such as time and date stamps that reflect conditions that exist locally for each facsimile machine. Accordingly, each device provides the other with local information related to when or where the transmission took place, for example. The local information need not necessarily be accurate, such as may be the case when a device has an incorrect date, but does provide an indication of acknowledgement of the transmission and the local conditions as perceived by the device.

According to a feature, the disclosed system and method verify receipt of a facsimile transmission. A signature page generated by the sender or by the receiver verifies the transmitted content, as well as transmission parameters such as the time and date indicated by the sender or receiver. The authentication signature may be in the form of a page or a code embedded in the facsimile transmission, such as in an unused area of the image or a margin, for example. In addition, or alternately, an acknowledgement of receipt by the receiving device may be incorporated into the authentication signature. In accordance with this feature of the disclosed system and method, receipt can be verified by examining the authentication signature, or by regenerating an authentication signature based on an electronic form of the transmission that is maintained in storage.

According to one aspect, the present disclosure provides a verification item for the signature page to contribute to verifying the authenticity of the signature page. In one exemplary embodiment, the signature page includes verification indicia, such as a checksum. The checksum may optionally be encoded, or be part of an encoding of other information. Various encoding techniques may be used, such as encryption. Other symbols or indicia that are dependent upon the originally transmitted information may be used. The checksum or other indicia for the signature page may be in the form of machine-readable symbols, such as bar code, for example, and may be encoded before being put into such a form.

According to another aspect, the present disclosure provides a system and method for authenticating a transmission representing a hard copy document with the use of public/private key pairs. The sender and/or receiver generates the signature page with a private key, and authentication of the signature page is achieved using a public key paired with the private key. According to the disclosed system and method, the signature page may be freely authenticated, and establishes the sender and/or receiver as the actual source of the transmitted information or authentication signature.

According to another aspect, the present disclosure provides a system and method for mutual assurance and validation of transmission content and transmission time through the use of an electronic/digital token. In an exemplary embodiment, a sender transmits a token that includes the local time of the sender and an element generated using a private key related to the sending device. The receiving device transmits to the sending device a token that includes a local time stamp and an element created using a private key related to the receiving device. The receiving device may include the token from the sending device. The sending device uses the token from the receiving device or the combined token to create an authentication signature. The authentication signature may be used by the sender and/or transmitted to the receiver for authentication of the transmission. The receiver in this instance cannot repudiate reception of the transmitted information. In addition, the token can be used to verify the identity of the sender and receiver and the time that each believes the transmission occurred.

According to another aspect, the present disclosure provides a system and method for authenticating a document image after the image is modified, such as by execution with a manifestation of assent, such as indicia of agreement or approval. Such indicia may be supplied by the receiver in the form of a biometric signature or Personal Identification Code (PIC), for example. The indicia of execution of the image document may also reflect a time and date, or other indications that help assure the validity and non-repudiation of execution. The electronic document and indicia of agreement or approval, such as the biometric signature or PIC, is transmitted to the sender. If the sender wishes to verify the content of the executed document upon return to the sender, the originally generated authentication signature may be used to verify that the document content is not altered. The execution indicia verify the receiver's agreement to the document, while the authentication signature attests to the non-alteration of the agreed-to document. The execution indicia provided by the receiver may be embedded in a portion of the received document image, or appended to the document image for return to the sender. If the execution indicia are to be embedded in the document, the computation that generates the authentication signature may be tailored to avoid a portion of the document in which the execution indicia of the receiver is to be embedded. Moreover, if an authentication signature is generated by the receiver for the originally transmitted document, it may also include the execution indicia indicating agreement to the document content. In such an instance, the execution indicia may be encrypted into the authentication signature to also provide a secure means for verifying the signatory party, verifying the receiver and verifying non-alteration of the executed document image.

According to another aspect, the presently disclosed system and method generates authentication signature components for portions of the document, and optionally assembles the authentication signature components to form a single authentication signature page. For example, a sending device may generate an authentication signature component for each page of a document transmitted, or a section of a transmitted page. If a document section is modified, the modified sections or pages may be detected by comparison with the original sender generated authentication signature components. Alternately, or in addition, document sections such as a number of pages, a single page or a portion of a page may be excluded from authentication. This concept focuses on authentication of portions of the document content, rather than portions of the transmitted electronic document that may be intentionally altered. For example, some portions of the document content are not used for authentication purposes to create an authentication signature. For instance, margins may be excluded from an authentication signature computation, so that any differences that may occur in the margins of facsimile transmitted documents do not impact the authentication process or functionality. The omission or exclusion of certain areas of the facsimile transmitted document from the process for generating the authentication signature permits the authentication signature to be more flexible and robust, especially since facsimile transmitted documents are often purposefully modified as a result of transmission. One example of a purposeful modification is observed in the addition of information related to the sending facsimile device in a margin of the received document. This modification is conventionally used to indicate the source of the facsimile document, and elimination of the modified area from the authentication signature generation process permits the authentication signature to be consistently generated.

According to a further aspect of the present disclosure, a sending or receiving device generates a region-by-region signature component or signature page for a transmitted or received document. The region-by-region signature component or page indicates when region content changes and the particular region image content that is changed.

According to a feature, the present disclosure provides a system and method for authenticating a document based on a transmission of the document. The authentication may be in the form of an authentication signature that is separately available from the transmission, or included in the transmission. The authentication signature may be in the form of an additional page provided with the document transmission, or may be supplied in an unused portion of the transmitted document. For example, the authentication signature may be in the form of symbols or codes that are incorporated into a transmitted document, either at a sender or at a receiver's device, or both. The document itself may be a hard copy document that is converted into electronic form prior to or during transmission. Alternately, or in addition, the document may subsist in electronic form, which may be the original form of the document. That is, no hard copy of the document need be created at the sender, or at the receiver. Moreover, the received document may be retained in electronic form, without a hard copy being produced. Accordingly, the authentication signature may be formed on an electronic document at the sender or at the receiver's device.

According to another aspect, the present disclosure provides an introductory page and a trailing authentication signature page for a document. The introductory page includes machine generated and/or machine-readable instructions for scanning the pages or parts of the document. The instructions may set up or adjust scanning or facsimile transmission parameters. The introductory page and the signature page may include checksums that are matched to verify a true copy of the transmitted document is received at a receiving facsimile device.

According to a feature of the present disclosure, a leading and trailing page of facsimile transmitted document are prepended and appended to the transmitted document, respectively. Differences in the transmitted and received documents are identified by reviewing the content of the first and last pages.

Applications for the disclosed system and method may include environments in which a party wishes to establish the authenticity of a facsimile transmitted document. One example is a facsimile server in which the facsimile server electronically signs each facsimile transmission. Another example is verification of receipt of an order, such as by a facsimile server.

BRIEF DESCRIPTION OF THE SEVERAL VIEWS OF THE DRAWINGS

Features of the present invention are described in greater detail below in conjunction with the accompanying drawings, in which.

DETAILED DESCRIPTION OF THE INVENTION

In accordance with the present disclosure, a system and method for verifying a facsimile transmission is provided. The verification is based in part on the transmission of a document, rather than a particular content of the document alone. In this description, document is used to mean information related to an image that is transferable between facsimile devices. This usage includes images or portions of images derived from paper or hard copy scans, and can be abbreviated, truncated, condensed, expanded or appended to before, during or after transmission. This usage also contemplates electronic form, text or graphics that have no original paper counterpart.

The system and method provided in the present disclosure is unique to facsimile transmission systems, where a sender transmits a facsimile, or an electronic image of an original document, and typically retains the original hard copy of the document. The facsimile document in electronic form is stored or saved by one or more of a sender or receiver, for use in later authentication. The system and method of the present disclosure address a number of issues related to verification of the transmitted information, including alteration of a received electronic document generated at a receiving facsimile device. For example, the sender may wish to verify that the received facsimile document is not altered after receipt. In addition, the sender or receiver may wish to verify that the received facsimile was sent from the sender's facsimile device. The system and method of the present disclosure also addresses the converse situation, where a facsimile receiver may wish to prove to the sender that a received facsimile is unaltered. Furthermore, the facsimile sender or receiver may wish to verify that the facsimile document arrived at the receiver's facsimile device. Some instances where these issues are readily applicable include facsimile transmitted orders, contracts, agreements, publication services and so forth.

Figure 1A:
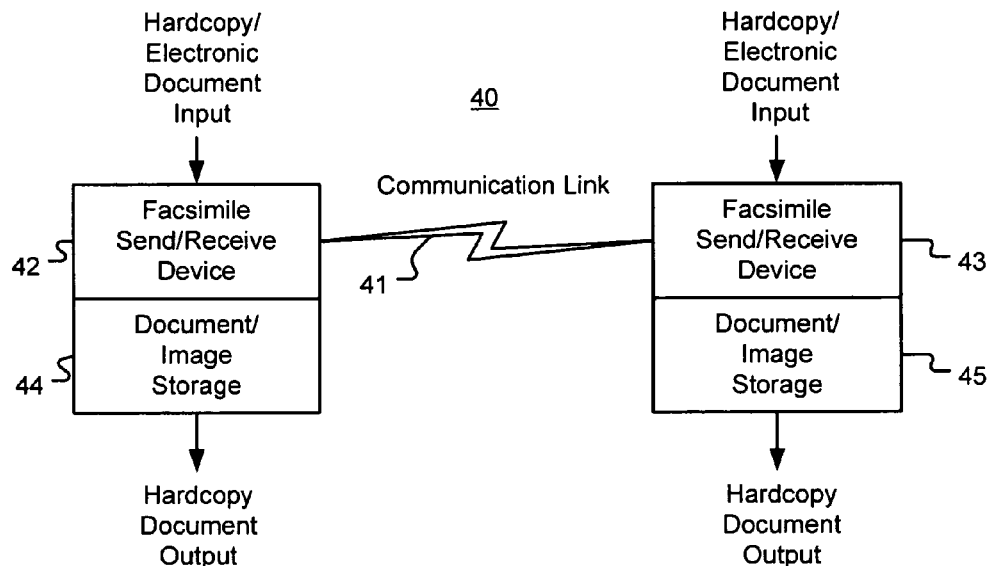
FIGS. 1A and 1B are block diagrams of a facsimile transmission system with authentication in accordance with the present disclosure.

Referring now to FIG. 1A, a diagram of a facsimile communication system 40 is illustrated. System 40 includes two complimentary facsimile devices 42, 43 for sending and receiving facsimile documents over a communication link 41. Communication link 41 may be formed through any typical physical media used for communication, including wireless, fiber optic, traditional telephone lines or combinations of any different types of media for communication. Devices 42, 43 may also form components in a traditional telephone network, a local area network (LAN) or a wide area network (WAN), so that they can send or receive facsimile documents within a network of electronic devices. For example, device 42 as part of a LAN may receive instructions from an electronic device within the LAN to transmit an electronic form document from the electronic device to facsimile device 43, or an electronic device coupled to facsimile device 43.

Devices 42, 43 may communicate with a number of types of protocols that may depend upon characteristics of the communication link, such as the physical media used or the connectivity for the communication link. A common example of a communication link that may have many different types of physical media is a switched network. Switched networks may take the form of a Public Switched Telephone Network (PSTN) or a digital packet switched network, such as an Internet Protocol (IP) network. A switched network may have a number or different types of physical media that the user, or devices 42, 43, may take advantage of, such as wireless, fiber optic cables, coaxial cabling, twisted pair(s) and so forth. Devices 42, 43 typically have protocols for connecting to the network through the available physical media. In addition to the physical media protocol, devices 42, 43 have a transport or communication protocol for establishing a communication link and sending or receiving information over the communication link. Various protocols available for devices 42, 43 may take advantage of analog telephone lines, digital telephone lines and switching networks such as PSTN or IP networks. For example, devices 42, 43 may communicate over an analog telephone line and conform to group 2 or group 3 communication standards including International Telecommunication Union, Telecommunication Standardization Sector (ITU-T) recommendations T.30, T.3 or T.4. In the case of digital telephone lines, devices 42, 43 may communicate with group 4 standards, such as ITU-T recommendations T.6, T.62, T.503, T.563 or T.611, among others.

In the case of a switched network such as an IP network, facsimile devices 42, 43 may communicate on a real-time or store-and-forward basis. A real-time basis typically takes advantage of voice over IP (VoIP) to send an audio stream over an IP network. VoIP protocols such as SIP (Session Initiation Protocol), IAX (Inter-Asterisk Exchange) and H.323 based on ITU-T recommendations may be used. In this type of environment, a codec typically converts the audio stream to a digital form for VoIP. One such protocol that provides for real-time Facsimile over IP (FoIP) is the ITU-T T.38 standard for real-time mode messages based on a User Datagram Protocol (UDP) or Transmission Control Protocol/Internet Protocol (TCP/IP). The real-time mode T.38 IP based facsimile service or protocol maps the T.30 facsimile protocol onto an IP network. The T.38 service uses two protocols, one for UDP packets and another one for TCP packets. The T.38 service supports VoIP protocols such as SIP, IAX and H.323 for transmitting a facsimile data stream over a switched network.

In a store-and-forward mode, devices 42, 43 communicate through FoIP gateways that store and forward facsimile data. Each FoIP gateway stores an image of the transmitted facsimile data and sends the data using Simple Mail Transfer Protocol (SMTP) or other transport mechanisms to another FoIP gateway where the image is decoded and available for a receiver. This type of mode is similar to that used by email messages.

Facsimile devices 42, 43 include storage components 44, 45, respectively, that are capable of storing documents or images that are to be transmitted or have been received by the corresponding facsimile device. Storage 44, 45 may be composed of large scale memory components to store large amounts of image information for such purposes including record keeping, backup or compliance with regulatory requirements. For example, storage 44, 45 may keep a record of every facsimile document or image that is sent or received on respective facsimile devices 42, 43. Facsimile devices 42, 43 also permit scanning of hard copy documents for storage or transmission, and are capable of producing hard copy documents based on received facsimile information or stored information found in storage 44, 45. In this way, facsimile devices 42, 43 have many different applications, including document scanning and image storage, as well as document or image transmission or reception. Facsimile devices 42, 43 also include software and/or hardware for controlling document image storage or retrieval and facsimile transmission and reception.

According to one aspect of the present disclosure, one or more of storage 44, 45 are add-on components to devices 42 or 43. Storage 44 or 45 may be expandable for additional memory or storage, and may provide additional functionality. For example, storage 44, 45 may be composed of components that sense or observe information sent or received on communication link 41. In such a capacity, storage 44, 45 performs functions such as converting information from an analog communication link to a digital form for storage or generation of an electronic signature or signature page. The add-on component may operate in parallel with devices 42, 43, or may be incorporated into the operating capacity of devices 42, 43. By providing a sensing and recording add-on component to devices 42, 43, existing equipment using analog technology, for example, can be made compliant with document retention regulatory requirements or other information retention policies, such as corporate policies.

For real-time facsimile transmissions, facsimile devices 42, 43 typically establish a communication channel over communication link 41 with established communication protocols to exchange information for facsimile communication. For example, facsimile device 42 may initiate a call over a packet switched network, such as an IP network, by initiating a session with SIP support, as discussed above, to establish a communication link with facsimile device 43. The session initiation may include invitations and acknowledgements for participation in the call over a packet switched network. Typically, the session initiation involves a proxy server that transmits IP messages between the sender and receiver with SIP support. Various messages may be transferred between sender and receiver during the session initiation. For example, facsimile device 42 may query facsimile device 43 for parameters of transmission, such as operating speed, capacity, type of transmission protocol in use, and so forth. Facsimile device 43 may provide facsimile communication information to facsimile device 42, as well as pose information queries for parameters related to facsimile transmission. One or more proxy servers may store some or all of the parameter information. Typically, once facsimile devices 42, 43 have negotiated common parameters and protocols, transmission of the facsimile information commences.

SIP support provides for different modes of encryption that may be used to send messages from a sender to a receiver through a proxy server. For example, SIP support permits end-to-end encryption of the SIP message body and certain sensitive header fields. Hop-by-hop encryption prevents an eavesdropper from tracking who is calling whom and hop-by-hop encryption of VIA fields hides the route a request has taken. In addition, SIP support provides authentication using HTTP basic and digest schemes, which can provide rudimentary authentication for a source of a request. PGP authentication is also available in the SIP support model so that a sender can be authenticated based on information relayed within each of the packets. Accordingly, while SIP support provides encryption and authentication support for the transmission packets, there is no supported functionality for authentication of the overall message or document being sent.

An exemplary embodiment of the disclosed system and method provides software and/or hardware to instruct facsimile devices 42, 43 to generate local or general transmission authentication information related to the transmission or reception of the facsimile information. Authentication information may be generated at only one of devices 42, 43, both, or in conjunction with each other, such as sequentially using information from both devices 42, 43, for example. The authentication may or may not be independent of physical media and protocol. Also, the authentication information may be in the form of symbols that are incorporated into the facsimile information. The symbols may be located in an unused portion of a document, such as a margin, for example. The authentication information may also be embedded in the document itself, such as with nonprintable or non-displayed codes. In such an instance, the document can be configured to be "self-authenticating," where the authentication information in the document is used to verify the document itself. Authentication information may be encrypted for security purposes or to provide validation for the identity of a source of information.

In an exemplary embodiment, facsimile device 42 acting as a sending device may generate authentication information based on a transmission sent over communication link 41. The authentication information may be in the form of a page that is appended to the original facsimile document, as referred to herein as a "signature page." The signature page may include information related to the transmission and content of the document, which is codified using an established computation for use in later verification. The signature page may be generated solely at facsimile device 42 and made available to the sender as a verification tool. Alternately, or in addition, the signature page may be transmitted to facsimile device 43 along with the transmitted document so that the receiver has a copy of the signature page as well. Furthermore, facsimile device 43 as a receiving device may also generate a signature page based on reception and content of the transmission document. The receiver signature page may be provided to the receiver for verification purposes, or can be returned to the sender, such as by being transmitted through communication link 41 to facsimile device 42 for further verification testing purposes. In any case, facsimile devices 42, 43 are capable of generating signature pages and transmitting signature pages, based on the content and transmission of electronic documents that can be drawn from storage 44, 45 or from a hard copy document input.

When communication link 41 is a real time dedicated point-to-point link, such as an analog telephone line, a digital telephone line, a PSTN connection or a VoIP or FoIP link, one-way transmission verification can easily be obtained in accordance with the disclosed system and method through the generation of authentication information at the sender, the receiver, or both. In a store-and-forward mode, authentication information can be generated for each link in the transmission sequence. For example, a transmitted image from a sender to a first intermediary receiver may include a first signature page. As the image is forwarded from the first intermediary to a second intermediary receiver, another signature page can be generated and appended to the transmission. Accordingly, various links in the transmission sequence may include a specific signature page that verifies receipt of the transmitted image in the given individual link. A final destination receiver may receive a number of signature pages that represent the number of forwarding entities, including the sender, that generate signature pages over the path that the facsimile transmission has traveled. Each point through which the transmission passes need not produce a signature page. In addition, or alternately, a single signature page may be transmitted with the image transmission, and various intermediary receivers in the transmission sequence may modify the signature page with parameters associated with the intermediary. In such a configuration, the ultimate receiver receives the image transmission and a single signature page. In this configuration, intermediaries may re-verify the transmission based on the received signature page, and regenerate a signature page based on the next forwarding point in the communication link. The original sender may be provided with a copy of the ultimate signature page to verify receipt of the transmission and the content of the delivered image. The ultimate receiver of the image transmission also can verify the identity of the original sender when that information is included in the transmitted signature page(s).

Figure 1B:
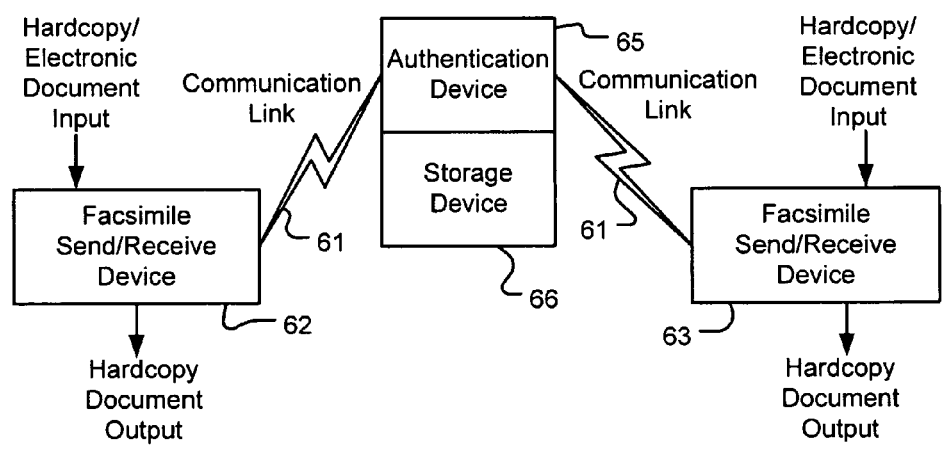

According to another embodiment illustrated in FIG. 1B, a facsimile communication system 60 is illustrated. System 60 includes facsimile devices 62, 63 that send and receive facsimile documents using a communication link 61. Facsimile devices 62, 63 operate similarly to facsimile devices 42, 43 and a reference is made to the above description.

In the embodiment shown in system 60, an authentication device 65 communicates with facsimile devices 62, 63 and provides authentication functions for information transmitted between facsimile devices 62, 63. For example, authentication device 65 generates a signature page that includes coded information derived from the information transmission between facsimile devices 62 and 63. Authentication device 65 may also include authentication information on a portion of a transmitted document, for example, such as in an unused portion of the document such as a margin. Authentication information may also be embedded in a document with authentication device 65. In such an instance, the embedded authentication information may be invisible to an individual viewing the image, such as may be the case with nonprintable or non-displayed codes placed in the electronic image representation to provide the authentication information for the document. Authentication information such as a signature page or a copy of the transmitted information with added authentication information can be stored in a storage device 66. The signature page or authentication information can be transmitted to facsimile devices 62 or 63, either as a result of transmission of information on communication link 61 or as retrieved from storage device 66. Facsimile devices 62, 63 may also include storage components (not shown) for storing electronic form information or documents. Facsimile devices 62, 63 may also transmit and receive documents or information that are electronic in original form. In such a case, authentication information may also be stored in electronic form. Alternately, or in addition, facsimile transmitted information may originate in a hard copy form that is converted to electronic form with facsimile devices 62, 63. Hard copy documents may be sent or received using scanners or printers, for example, in facsimile devices 62, 63.

Figure 2:
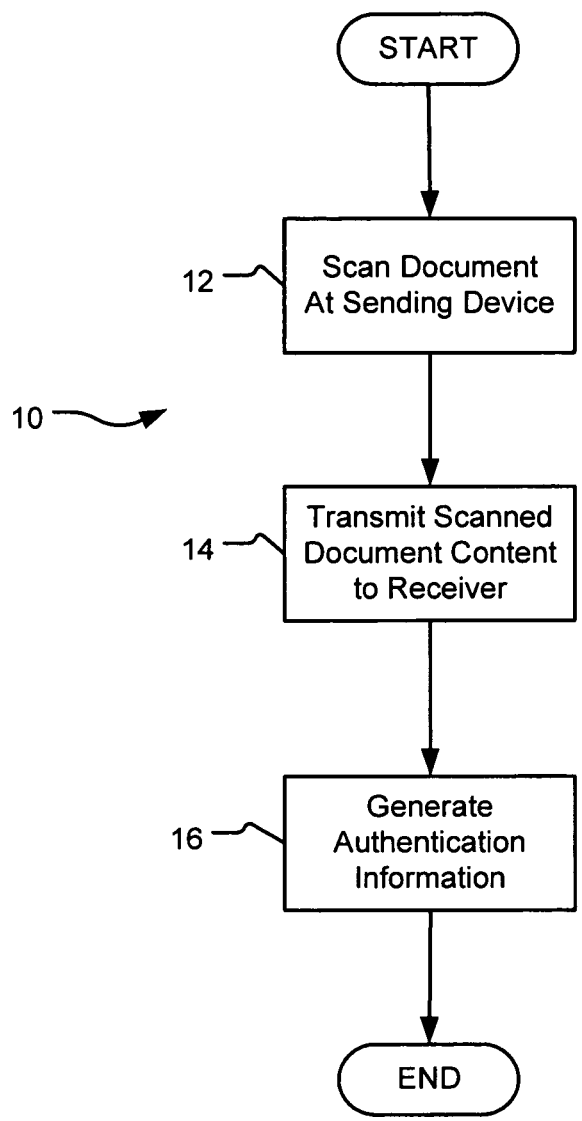
FIG. 2 is a simple flow chart illustrating an authentication generated from a transmitted document scanned at a sending device.

Referring now to FIG. 2, a flow chart 10 illustrates a process for generating authentication information at a sending facsimile transmission device. In block 12, a hard copy document is scanned to convert the document to electronic form. The resulting document image can be stored in memory that is local to the facsimile device or immediately transmitted to a receiving facsimile device. In block 14, a scanned document is transmitted to the receiving device.

While blocks 12 and 14 contemplate a scanned document for transmission, it should be apparent that an image already in electronic form may be used as the facsimile source for a transmission. For example, electronic form images or documents may include text documents produced using a word processor, or image type documents such as PDF or TIFF form documents. A word processor program may include embedded software to convert a text based electronic document to an image form for transmission by a facsimile device. The word processor may include software to directly send a text document over a network coupled facsimile device for example, after conversion of the text document to suitable form, such as PDF or TIFF. In block 16, authentication information is generated at the sending facsimile device. The authentication information can be generated during transmission of the facsimile document, or at the completion of the transmission process. The authentication information may be generated in the form of a signature page, which is then made available to the sender for verification of the content and transmission of the facsimile document.

Figure 3:
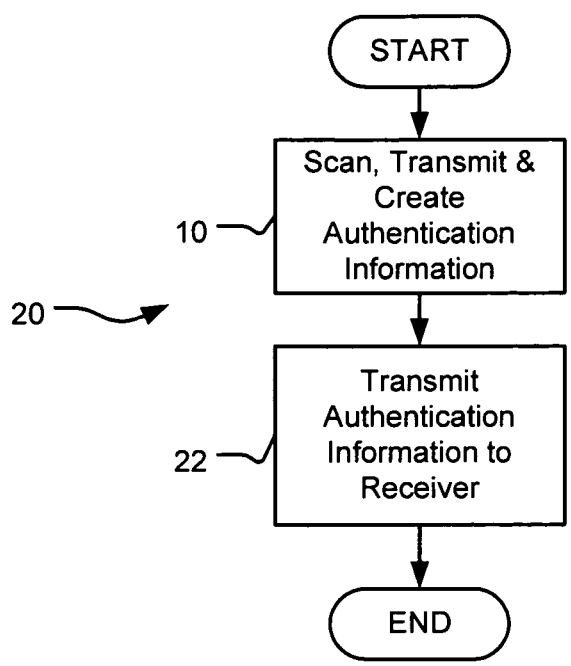
FIG. 3 is a flow chart illustrating the transmission of previously generated authentication information.

Referring now to FIG. 3, a flow chart 20 illustrates an operational scenario of the present disclosure where authentication information is transmitted to a receiver in addition to a facsimile document. Block 10 illustrates the operations of scanning, transmitting the facsimile document and creating authentication information from the transmission and content of the document, as discussed with respect to FIG. 2. Block 22 illustrates the operation of transmitting authentication information to the receiver. Authentication information can be represented in the form a signature page that is appended to the document transmission. The receiver receives the transmitted document and the appended signature page that can be used for verification of the sent document.

Figure 4:
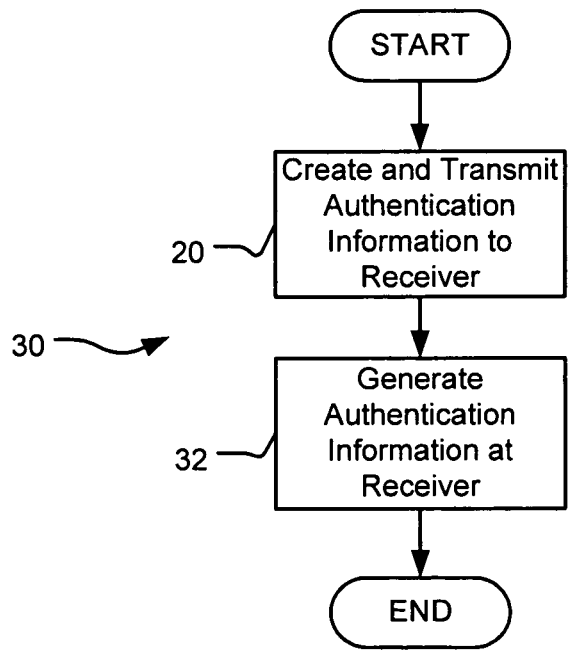
FIG. 4 is a flow chart illustrating generation of authentication information at a receiving device.

Referring now to FIG. 4, a flow chart 30 illustrates another exemplary embodiment of the disclosed system and method. Flow chart 30 includes a block 20 that represents the creation and transmission of authentication information to a receiver, as shown in FIG. 3. Block 32 illustrates the operation of generating authentication information at the receiver. The authentication information in block 32 may be in the form of a signature page generated at the receiving facsimile device based on transmission and content of the facsimile document. The signature page may be presented to the receiver, or may be returned to the sender for verification of the transmission. If a signature page was sent from the sending device along with the facsimile document, the receiving device can generate a signature page that includes the information related to the signature page from the sender. That is, the sender signature page or authentication information may form part of the content for generating the signature page at the receiver. As illustrated in FIG. 1B, authentication information may be generated by a third party with authentication device 65, and the authentication information can be stored, or transferred between facsimile devices 62, 63. In this way, transmissions between facsimile devices 62, 63 can be authenticated, for example by having the facsimile devices echo back the information and/or signature page, which can be verified at authentication device 65.

The above-described variations for generating authentication information produce signature pages, for example, based on the occurrence of various events. A signature page may be generated for a sender upon transmission of a facsimile document. A signature page may be generated for a receiver upon reception of a facsimile document. A sender or receiver may transmit or cause a signature page to be transmitted to their counterpart with the transmission or acknowledgement of a facsimile document.

The signature page itself need not be an entire document page, but can consist of a code or set of symbols that provide an electronically generated authentication signature based on transmission and/or content of the facsimile document. The authentication signature can be attached to a portion of the facsimile document itself, in an area not used to generate authentication information, such as reserved space or margins, for instance. The authentication signature may also be embedded in the document so that it is not visible in the image itself, as may be achieved with the use of nonprintable or non-displayable codes in the electronic image representation. Such an embedded authentication signature may permit the document to be "self-authenticating," where the authentication information in the document is used to verify the document itself. The signature page can also represent verification information for collective portions of the transmitted facsimile document. For example, authentication information can be generated on a region-by-region basis, such as by defining portions of a document page for which separate authentication information is generated. The authentication information then represents a number of portions of a facsimile document page. Accordingly, one or more authentication signatures can be generated for a single transmitted facsimile document.

When a document is authenticated on a region-by-region basis, a number of advantages for certain applications are available. For example, when a transmitted document is authenticated on a region-by-region basis, any change to a region can be indicated, and a region that changes can be identified. One instance in which region-by-region authentication proves useful is for execution of contracts or agreements in which a receiver provides indicia of assent, such as, for example, a biometric signature or PIC. In this example application, a sender may present a complete contract to the receiver over a facsimile communication link. The receiver may supply the execution indicia for agreement or approval of the facsimile document and return the same to the sender. The execution indicia may take on a number of forms, including coded passwords, biometric signatures based on hand signatures, thumbprints, and other verifiable indicia of binding personal consent. The biometric signature or PIC may be an image of a hand signature, for example. In any case, the biometric signature or PIC occupies a certain region of the transmitted document image that can be excluded from authentication processing. The region-by-region authentication works to validate the content and source of the returned document to assure the sender that no content of the contract has changed, except for the region in which the biometric signature or PIC is applied by the receiver.

Another technique that accommodates a contract transmission application is to avoid authenticating a region having indicia of execution. The region can be reserved as a page or a portion of a page of the transmitted document image. The document with the execution indicia returned to the sender can then be authenticated for source and content to verify the parties and that no changes were made to the contract provisions.

One exemplary technique for authenticating regions or facsimile documents in their entirety is through the use of encryption. For example, the content and transmission of a facsimile document can be used in the encoding of an encrypted, electronically generated authentication signature that is tamper free for later verification.

Figure 5:
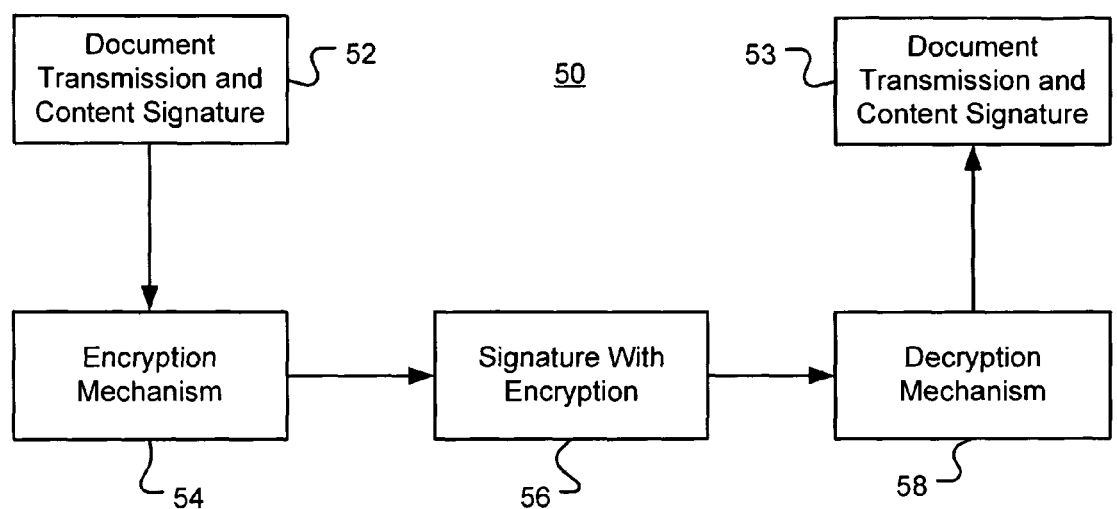
FIG. 5 is a block diagram of an encryption process in accordance with the present disclosure.

Referring to FIG. 5, a process 50 is illustrated for protecting the electronically generated document authentication signature with encryption. Block 52 represents a document signature derived from a transmission and content of a facsimile document. The document signature is encrypted with encryption mechanism 54 to produce an encrypted document signature 56. One example of an encryption mechanism 54 is a public/private key pair mechanism. For example, a sender can encrypt the document signature with a private key, while a decryption mechanism 58 uses a public key to decrypt and validate document signature 53. With such a mechanism, document signature 52 is protected so that comparisons between document signature 52 and document signature 53 reveal any changes to the facsimile document. Document signatures 52, 53 are also protected from exposure to potential tampering. In addition, the private key as part of encryption mechanism 54 verifies that only the sender can generate encrypted document signature 56, thereby verifying the source of the facsimile document. This verification ability provides a non-repudiation feature, where the sender can not deny the document source and transmission, as well as document content.

Another example of an encryption mechanism 54 is PGP (Pretty Good Privacy), which can be used to encrypt messages between a sender and receiver based on public/private key pairs. In this context, messages refer generally to information transferred between a sender and receiver, including facsimile information transferred over a store-and-forward type communication system, for example. PGP encryption provides message privacy through message encryption during transmission of the information. That is, the body of the message itself is encrypted, typically with a public key provided by a requester so that the requester receiving the encrypted message can decode it with a private key corresponding to the previously sent public key. However, there is no assurance to the recipient of the request that the received request or response came from the stated party, such as may be determined with a from field of a message header, for example. A typical advantage of PGP encryption is that proxy or intermediate transmission points are unable to modify the request or response. If the relevant fields in an SIP request or response are not encrypted, it is also possible for an eavesdropper to see who is corresponding with whom, such as by examining the to and from fields. Encryption of these address fields can be achieved using PGP, but may cause some intermediate points or proxies to return an unauthorized message, for example, if a missing entry in the from field is required.

Decryption mechanism 58 may be employed at a later time or date to decrypt encrypted document signature 56. For example, encrypted document signature 56 may be stored at a sending device a receiving device or an intermediary, at the same time as transmission or at a later time. Encrypted document signature 56 can be decrypted to verify document signatures 52, 53 at a later time than that at which the document transmission occurs. Accordingly, encrypted document signatures 52, 53 may be stored and verified through being decrypted at any given time after the transmission of the corresponding document takes place.

As indicated above, once an encrypted document signature 56 is generated, verification of document signature 52 can be obtained by applying decryption mechanism 58 to obtain document signature 53. With the verification process, document signature 52 should match document signature 53 to verify that the document and transmission parameters are valid.

Various parameters related to the facsimile transmission of information may be incorporated into an authentication signature according to a number of different techniques. For example, a fax transmission often begins with an exchange of information between the sender and receiver. Exchanged information may include public keys, time and date information, available protocols, party identifiers, such as names and/or facsimile telephone numbers, and so forth. Some of the exchanged information can be incorporated into the facsimile transmitted information, such as in a margin area to associate the transited information with a sender and time and date, for example. Any of these types of parameters may be used in the generation of authentication information that is used to form a signature page or signature information that is incorporated into a facsimile transmitted document. The parameters that are available for incorporation in an authentication signature may vary depending upon the type of system. For example, IP addresses may be used in a real-time or a store-and-forward type system over a switched IP packet network. In general, the authentication signature contributes to identifying a sender and receiver and unique characteristics related to the facsimile transmission to uniquely identify the message. The authentication signature verifies receipt of the transmitted image, and verifies image content in one or more transmission directions.

Process 50 describes both the technique for creating an encrypted document signature and verifying the document transmission and content based on the decrypted document signature and comparison. Process 50 may be applied at a sending device to generate a local encrypted signature page, or can be applied as part of a transmission process where an encrypted signature page is generated and optionally delivered to a receiving device and decrypted for validation. In addition, process 50 may be applied for two-way validation, where an encrypted signature page is delivered to a receiving device, which generates its own encrypted signature page based on the content and transmission of the facsimile document and the received signature page, and both encrypted signature pages are returned to the sender. In this way, both the sender and the receiver have verification information related to transmission and receipt of the specific facsimile document.

An exemplary variation on the above described verification technique provides for the sending and receiving devices to exchange tokens encoded with the private keys of each device. For example, a sending device provides a token that includes local time and other parameters related to the sending device that is encrypted with a private key of the sending device or a public key of the receiving device. The receiving device creates a token with similar characteristics encrypted with the receiving device private key or a public key from the sending device. In an exemplary embodiment, the encryption may be performed by a third party at a remote location. The receiving device then sends both tokens back to the sender, where they are inserted into a signature page. The signature page can be maintained by the sender, delivered to the receiver with the facsimile document, or both, or be maintained by a third party. With the exchange of the tokens, the receiver can not repudiate or deny receipt of the facsimile document at the receiving device. Accordingly, the token exchange contributes to verifying the identity of the sender and the receiver, and the time that each believes the transaction occurred.

Various techniques may be used for validating authenticity of a facsimile transmitted document with the system and method of the present disclosure. One exemplary technique is to provide a coded checksum of the stream of data transmitted from the sending device to the receiving device. A number of different checksum calculations are available, and may be made application specific, as is known. Coding can include standard bar codes, two-dimensional bar codes such as matrix or stacked bar codes, alpha-numeric or other symbols, encrypted symbols and so forth. The encryption may include a private key, for example. The generated signature page is then validated by computing a checksum of the facsimile transmitted data in the form of the received image and then comparing the computed checksum with the recorded signature page checksum. One advantage to using machine-readable codes, such as bar codes, is the ability of a scanning device, such as a facsimile device, to read and decode the checksum. As discussed above, the checksum computation may proceed by region, by being performed on portions of a page of a facsimile transmitted document, for example. A machine-readable code may be provided on a signature page for each checksum computed for each region of the transmitted document. Regions may be defined as an entire document, a single page, portions of a page, or a single portion of a single page. Regions may also be exclusive portions of a document, such as pages where the margins are excluded from checksum computation.

An exemplary application to which the disclosed system and method may be applied is certification of facsimile transmitted documents. For example, facsimile servers provide facsimile documents to a requestor automatically or upon being prompted. The facsimile transmitted document may be certified as to authenticity, origination point and time, in addition to content, through the use of an authentication signature as may be provided on an authentication signature page. The receiver of the facsimile transmitted document can verify the contents of the document based on the signature page generated and sent by the sending device.

Another application for the disclosed system and method involving a facsimile service is verification of information, such as time and date, for a given event. A sender transmits a facsimile document to the service, where a receiving device electronically signs each received facsimile document. The received document is transmitted back to the sender with authentication information, such as a page containing an electronic authentication signature. In this way, the facsimile service certifies the authenticity of the document, the origination source and time and date of document receipt. Such an application illustrates the advantages of the disclosed system and method over known systems in which acknowledgement of a sent facsimile document is in the form of a simple yes or no. The functionality of this application may be improved with the use of encryption, such as by encrypting the received facsimile document with the sender's public key of a private/public key pair. The sender or other parties wishing to corroborate the document authenticity and other document properties decrypts the returned facsimile document and authentication signature page to verify the identity of the document source, as well as content, time and date, as so forth.

The above-described application for the presently disclosed system and method may be adapted as an archival and storage system that permits regulatory compliance with applicable rules and regulations for a given industry, for example. A given industry may have a regulatory requirement for certain filings or document storage for a given period of time, as well as proof of compliance with such regulations. The disclosed system and method provide a means for satisfying document storage requirements, by also providing authentication information for compliance with regulatory requirements. The stored data and records of regulatory compliance can be encrypted according to the present invention, so that evidentiary proof of compliance is secure, tamper-free, and uniquely identifies the compliant entity. As a variation of the above-described regulatory compliance system and method, a third party repository can take advantage of the disclosed system and method to act as a clearinghouse for a number of industries while avoiding conflicts due to the secure nature of the record keeping and authentication that may be used to limit access to the preserved information.

A further application for the disclosed system and method concerns verification of receipt of an order. A facsimile service generates an authentication signature page containing authentication information based on a received facsimile document containing an order. The authentication information can include a time and date stamp, and can optionally be signed with the private key of the facsimile service. The facsimile document and/or authentication page is returned to the sender, by any available means, including post mail, email and facsimile transmission. The sender may then use the corresponding public key to validate the time of receipt of the order at the intended facsimile device or service.

A number of issues related to realizing the system and method according to the present disclosure are contemplated as being within the scope of the disclosure. Examples of related issues include processes or techniques to accommodate changes in resolution among different facsimile services or devices, as well as rotation or skew of a document, page, or portion of a page. The present disclosure contemplates techniques for addressing noise introduced in a scanning operation, including obstructions to scanning an image, such as dirt or other obscuring material, the introduction of lines on a page or document in any orientation or warping of the scanned document or pages. In addition, the present disclosure contemplates addressing changes in the scale, such as may occur with facsimile devices having different size paper, original documents having predetermined formations, such as being bound in a book or magazine, hole punches, staples or the like.

It will further be appreciated by those of ordinary skill in the art that modifications to and variations of the above-described disclosure may be made without departing from the inventive concepts disclosed herein. Accordingly, the invention should not be viewed as limited except as by the scope and spirit of the appended claims.

What is claimed is:

1. An apparatus for generating authentication information for an electronic document image that is transmitted by facsimile transmission, the apparatus comprising:
   a facsimile communication interface that is connectable to a physical medium that represents at least part of a communication network for sending or receiving facsimile data in accordance with a facsimile protocol, at least a portion of the facsimile data being derived from the electronic document image;
   a storage device communicatively coupled to the facsimile communication interface for storing the electronic document image;
   an authentication information generator that is connectable to the physical medium and being operative to read the facsimile data from the physical medium when the facsimile data is being sent or received by the facsimile communication interface via the physical medium and to produce authentication information during the facsimile transmission that is derived from the facsimile data read from the physical medium during the facsimile transmission; and
   a storage media interface communicatively coupled to the authentication information generator for storing the authentication information to a storage medium.

2. The apparatus according to claim 1, wherein the storage media interface further comprises a printer interface and the storage medium is paper.

3. The apparatus according to claim 1, wherein the storage medium is electronic, electromagnetic or holographic.

4. The apparatus according to claim 1, further comprising a scanner coupled to the storage device and operable to scan a paper document to produce the electronic document image.

5. The apparatus according to claim 1, wherein the electronic document image is derived from an electronic document.

6. The apparatus according to claim 1, wherein the authentication information generator is operable to produce a plurality of authentication information items related to portions of the electronic document image.

7. The apparatus according to claim 1, wherein the facsimile communication interface is operative to produce the electronic document image.

8. The apparatus according to claim 1, further comprising an encryption mechanism associated with the authentication information generator and operable to encrypt the authentication information.

9. The apparatus according to claim 1, wherein the authentication information further comprises at least one parameter associated with the facsimile transmission of the facsimile data via the communication network.

10. The apparatus according to claim 8, wherein the encryption mechanism is operable to encrypt the authentication information using a private/public key pair.

11. A plurality of facsimile communication devices communicatively coupled via the communication network, each of the plurality of facsimile communication devices being configured in accordance with the apparatus of claim 1.

12. The plurality of facsimile communication devices according to claim 11, wherein one or more of the plurality of facsimile communication devices is operable to transmit the authentication information to another one of the plurality of facsimile communication devices via the communication network during the facsimile transmission of the facsimile data.

13. The apparatus according to claim 1, wherein the authentication information is a checksum.

14. The apparatus according to claim 1, wherein the authentication information is in an encrypted form.

15. The apparatus according to claim 14, wherein PGP encryption is used to encrypt the authentication information.

16. The apparatus according to claim 14, wherein S/MIME encryption is used to encrypt the authentication information.

17. The apparatus according to claim 1, wherein the authentication information includes a time or date stamp.

18. The plurality of facsimile communication devices according to claim 11, wherein:
  one or more of the plurality of facsimile communication devices is operable to send a token to another one of the plurality of facsimile communication devices;
  the other one of the plurality of facsimile communication devices is operable to send a token to the one or more facsimile communication devices;
  the other one of the plurality of facsimile communication devices is further operable to return the token from the one or more facsimile communication devices to the one or more facsimile communication devices; and
  the token includes time or date information.

19. The apparatus according to claim 1, wherein at least a portion of the authentication information is provided in machine-readable form in the storage media.

20. A method for providing authentication for a document image that is transmitted by facsimile transmission, comprising:
  transmitting facsimile data associated with the document image via a physical medium that represents at least a part of a communication network in accordance with a facsimile transmission protocol;
  reading the facsimile data from the physical medium during the transmission of the facsimile data;
  during the facsimile transmission, computing authentication information from the facsimile data read from the physical medium during the facsimile transmission based on one or more of a content of the facsimile data being transmitted in accordance with the facsimile transmission protocol or a parameter related to the facsimile transmission via the communication network; and
  storing the authentication information in a storage medium.

21. The method according to claim 20, wherein the storage medium is paper.

22. The method according to claim 20, wherein computing authentication information takes place on a plurality of portions of the document image.

23. The method according to claim 20, further comprising encrypting the authentication information.

24. The method according to claim 23, wherein encrypting includes using a public/private key pair technique.

25. The method according to claim 20, further comprising transmitting the authentication information to a facsimile communication device.

26. The method according to claim 20, wherein computing the authentication information further comprises computing a checksum.

27. The method according to claim 20, wherein the authentication information includes time and date information.

28. The method according to claim 20, further comprising:
  transmitting a token from a facsimile communication device to an other facsimile communication device during the facsimile transmission;
  transmitting another token from the other facsimile communication device to the facsimile communication device; and
  including time or date information in one or more of the tokens.

29. The method according to claim 20, wherein storing the authentication information further comprises storing a machine-readable code in the storage medium.

30. A method for authenticating facsimile transmitted documents, comprising:
  transmitting facsimile data from a first facsimile machine connectable to a first physical medium representing at least part of a communication network to a second facsimile machine connectable to a second physical medium representing at least another part of the communication network, the facsimile data being transmitted in accordance with a facsimile protocol;
  during the facsimile transmission, computing first authentication information at the first facsimile machine from the facsimile data being transmitted on the first physical medium to the second facsimile machine;
  during the facsimile transmission, computing second authentication information at the second facsimile machine from the facsimile data being transmitted on the second physical medium to the second facsimile machine; and
  comparing the first and second authentication information.

* * * * *